US012809604B2

(12) United States Patent
Allen

(10) Patent No.: US 12,809,604 B2
(45) Date of Patent: Nov. 24, 2026

(54) STATIC DATAFLOW ANALYSIS FOR BUILD PIPELINES

(71) Applicant: Oracle International Corporation, Redwood Shores, CA (US)

(72) Inventor: Nicholas Allen, Westlake (AU)

(73) Assignee: Oracle International Corporation, Redwood Shores, CA (US)

( * ) Notice: Subject to any disclaimer, the term of this patent is extended or adjusted under 35 U.S.C. 154(b) by 278 days.

(21) Appl. No.: 18/659,820

(22) Filed: May 9, 2024

(65) Prior Publication Data

US 2025/0348297 A1 Nov. 13, 2025

(51) Int. Cl.
*G06F 8/41* (2018.01)

(52) U.S. Cl.
CPC .................................. *G06F 8/4452* (2013.01)

(58) Field of Classification Search
CPC ..................................................... G06F 8/4452
USPC ......................................................... 717/161
See application file for complete search history.

(56) References Cited

U.S. PATENT DOCUMENTS 8,914,590 B2 * 12/2014 Vorbach .............. G06F 15/7814 711/143
11,347,482 B2 * 5/2022 Seetharaman ......... G06N 5/046
11,948,003 B2 * 4/2024 Nandakumar ............ G06F 8/10
12,282,757 B2 * 4/2025 Namarvar ............. G06F 3/0649
12,417,214 B1 * 9/2025 Zhang ................... G06F 40/205
12,524,412 B1 * 1/2026 Chawla ............... G06F 16/2456
2010/0287214 A1 * 11/2010 Narasayya ............ G06F 16/217 707/759
2019/0005117 A1 * 1/2019 Vasisht ..................... G06F 8/70

OTHER PUBLICATIONS

Dasgupta, Arjun, Vivek Narasayya, and Manoj Syamala. "A static analysis framework for database applications." 2009 IEEE 25th International Conference on Data Engineering. IEEE, 2009. pp. 1403-1414. (Year: 2009).*
Sokolov, Danil, Ivan Poliakov, and Alex Yakovlev. "Analysis of static data flow structures." Fundamenta Informaticae 88.4 (2008): pp. 581-610. (Year: 2008).*
Abram, Greg, and Lloyd Treinish. "An extended data-flow architecture for data analysis and visualization." ACM SIGGRAPH Computer Graphics 29.2 (1995): pp. 17-21. (Year: 1995).*
Wu, Dongyao, et al. "Building pipelines for heterogeneous execution environments for big data processing." IEEE Software 33.2 (2016): pp. 60-67. (Year: 2016).*

(Continued)

*Primary Examiner* — Satish Rampuria
(74) *Attorney, Agent, or Firm* — Lathrop GPM LLP

(57) ABSTRACT

A method implements static dataflow analysis for build pipelines. The method includes receiving a workflow file that includes an operation. The method further includes applying an extraction model to the workflow file to generate an extracted statement for the operation. The method further includes applying a statement model to the extracted statement to identify an unresolved parameter of the extracted statement. The method further includes applying the statement model to the unresolved parameter to generate a resolved parameter using a set of extracted statements including the extracted statement. The method further includes presenting an output statement including the extracted statement with the resolved parameter.

20 Claims, 10 Drawing Sheets

300

(56) References Cited

OTHER PUBLICATIONS

Lampa, Samuel, et al. "SciPipe: A workflow library for agile development of complex and dynamic bioinformatics pipelines." GigaScience 8.5 (2019): giz044. pp. 1-13. (Year: 2019).*
Wang, Gao, and Bo Peng. "Script of Scripts: A pragmatic workflow system for daily computational research." PLoS computational biology 15.2 (2019): e1006843. pp. 1-14. (Year: 2019).*
Shukla, Sameer. "Developing pragmatic data pipelines using apache airflow on Google Cloud Platform." Int J Comput Sci Eng 10.8 (2022): pp. 1-8. (Year: 2022).*
Benedetti, G., et al., "Automatic Security Assessment of GitHub Actions Workflows", Scored '22, Nov. 11, 2022, 9 pages.
Bravenboer, M., et al., "Strictly Declarative Specification of Sophisticated Points-to Analyses", OOPSLA 2009, Oct. 25-29, 2009, 19 pages.
Muralee, S., et al., "ARGUS: A Framework for Stages Static Taint Analysis for GitHub Workflows and Actions", Proceedings of the 32nd USENIX Security Symposium, Aug. 9-11, 2023, 19 pages.

* cited by examiner

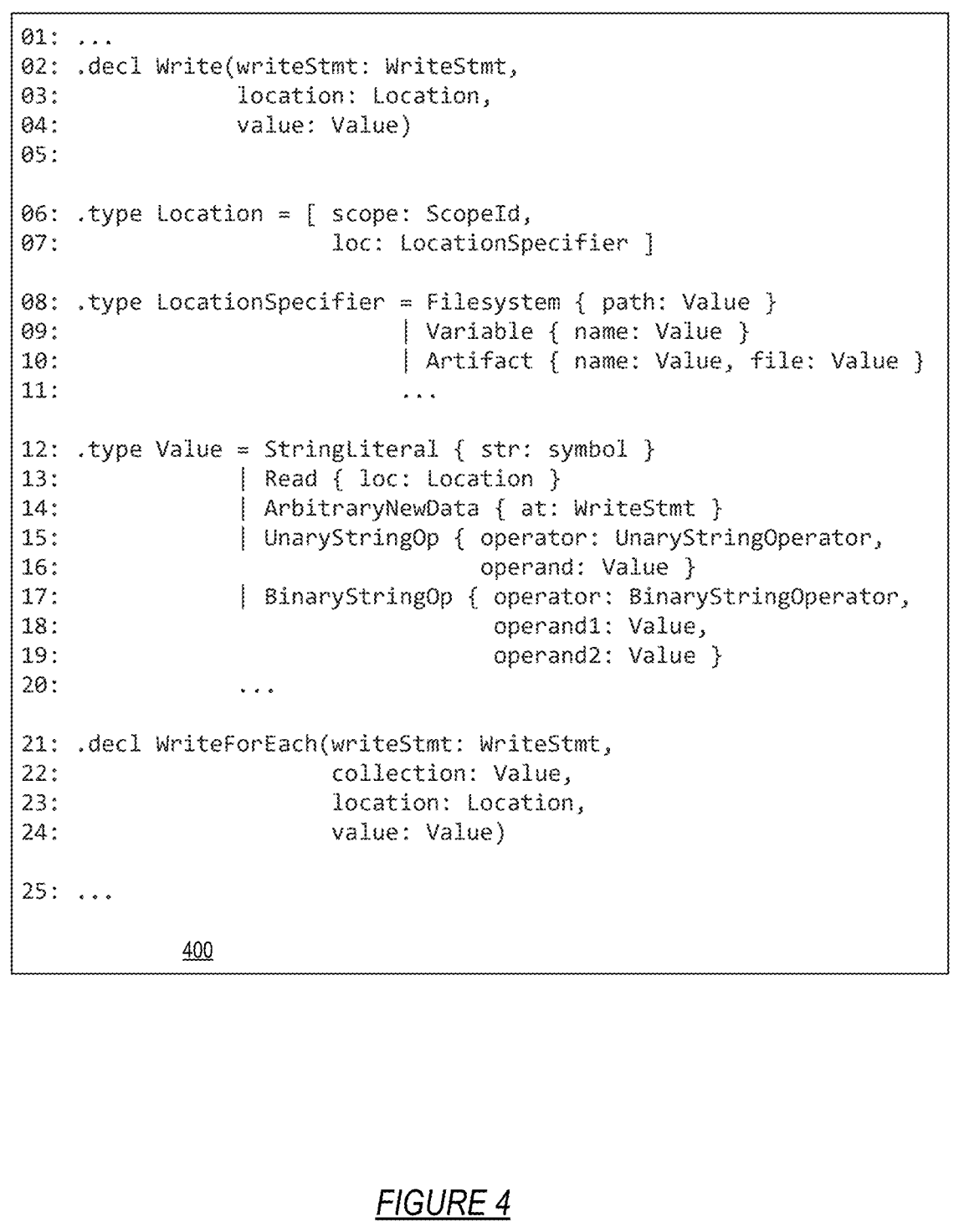

```
...
.decl Write(writeStmt: WriteStmt,
            location: Location,
            value: Value)

.type Location = [ scope: ScopeId,
                   loc: LocationSpecifier ]

.type LocationSpecifier = Filesystem { path: Value }
                        | Variable { name: Value }
                        | Artifact { name: Value, file: Value }
                        ...

.type Value = StringLiteral { str: symbol }
            | Read { loc: Location }
            | ArbitraryNewData { at: WriteStmt }
            | UnaryStringOp { operator: UnaryStringOperator,
                              operand: Value }
            | BinaryStringOp { operator: BinaryStringOperator,
                               operand1: Value,
                               operand2: Value }
            ...

.decl WriteForEach(writeStmt: WriteStmt,
                   collection: Value,
                   location: Location,
                   value: Value)

...
```

400

FIGURE 4

```yaml
name: CI
on: [push]
jobs:
  build:
    runs-on: ubuntu-latest

    steps:
    - uses: actions/checkout@8e5e7e5ab8b370d6c329ec48022133
    - uses: actions/setup-java@5ffc13f4174014e2d4d4572b3d74c3
      with:
        java-version: '17'
        distribution: 'temurin'
    - name: Build
      id: build
      run: |
        mvn package
    - name: Vars
      id: vars
      run: |
        ARTIFACT_FILEPATH=./target/greeter-jar-with-dependencies.jar
        echo "artifact_filepath=$ARTIFACT_FILEPATH" >> "$GITHUB_OUTPUT"
    - name: Upload build artifacts
      uses: actions/upload-artifact@0b7f8abb1508181956e8e162db84b4
      id: upload
      with:
        name: artifact
        path: ${{ steps.vars.outputs.artifact_filepath }}
        if-no-files-found: error
  release:
    needs: [build]
    runs-on: ubuntu-latest
    if: startsWith(github.ref, 'refs/tags/')
    steps:
      - name: Download artifact
        uses: actions/download-artifact@fb598a63ae348fa914e94cd0ff38f3
        id: download
        with:
          name: artifact
      - name: Create release
        uses: softprops/action-gh-release@de2c0eb89ae2a093876385947365ac
        id: release
        with:
          files: greeter-jar-with-dependencies.jar
```

500

FIGURE 5

```
...
Write("write@jobs.build.steps.2",                                         603
  ["filesystem:jobs.build", $Filesystem(
    $StringLiteral("./target/greeter-jar-with-dependencies.jar"))],
  $ArbitraryNewData("write@jobs.build.steps.2")).
Write("write@jobs.build.steps.3",                                         605
  ["env:jobs.build.steps.vars",
    $Variable($StringLiteral("ARTIFACT_FILEPATH"))],
  $StringLiteral("./target/greeter-jar-with-dependencies.jar")).
Write("write@jobs.build.steps.3_2",                                       607
  ["vars:jobs.build", $Variable($BinaryStringOp($StringConcat(),
    $StringLiteral("steps.vars.outputs."),
    $StringLiteral("artifact_filepath")))],
  $Read(["env:jobs.build.steps.vars",
    $Variable($StringLiteral("ARTIFACT_FILEPATH"))])).
Write("write@jobs.build.steps.4",                                         607
  ["pipeline_artifacts", $Artifact($StringLiteral("artifact"),
    $UnaryStringOp($BaseName(),
    $Read(["vars:jobs.build", $Variable(
    $StringLiteral("steps.vars.outputs.artifact_filepath"))])))],
  $Read(["filesystem:jobs.build", $Filesystem(
    $Read(["vars:jobs.build", $Variable(
    $StringLiteral("steps.vars.outputs.artifact_filepath"))]))])).
...
```

600

```
...
Write("write@jobs.build.steps.2",                                         653
  ["filesystem:jobs.build", $Filesystem(
    $StringLiteral("./target/greeter-jar-with-dependencies.jar"))],
  $ArbitraryNewData("write@jobs.build.steps.2")).
Write("write@jobs.build.steps.3",                                         655
  ["env:jobs.build.steps.vars",
    $Variable($StringLiteral("ARTIFACT_FILEPATH"))],
  $StringLiteral("./target/greeter-jar-with-dependencies.jar")).
Write("write@jobs.build.steps.3_2",                                       657
  ["vars:jobs.build", $Variable(
    $StringLiteral("steps.vars.outputs.artifact_filepath"))],
  $StringLiteral("./target/greeter-jar-with-dependencies.jar")).
Write("write@jobs.build.steps.4",                                         659
  ["pipeline_artifacts", $Artifact($StringLiteral("artifact"),
    $StringLiteral("greeter-jar-with-dependencies.jar"))],
  $ArbitraryNewData("write@jobs.build.steps.2")).
...
```

650

*FIGURE 6*

```
...
WriteForEach("write@jobs.release.steps.0",
  $UnaryLocationReadOp($FileList(), ["pipeline_artifacts,
    $Artifact($StringLiteral("artifact"))]),
  ["filesystem:jobs.release", $Filesystem($InductionVar())],
  $Read(["pipeline_artifacts",
    $Artifact($StringLiteral("artifact"), $InductionVar())])).

Write ("write@jobs.release.steps.1",
  ["releases", $Artifact(
    $StringLiteral("release@jobs.release.steps.1"),
    $UnaryStringOp($BaseName(),
      $StringLiteral("greeter-jar-with-dependencies.jar")))],
  $Read(["filesystem:jobs.release", $Filesystem(
    $StringLiteral("greeter-jar-with-dependencies.jar"))])).
...
```

703

705

700

```
...
Write("write@jobs.release.steps.0",
  ["filesystem:jobs.release", $Filesystem(
    $StringLiteral("greeter-jar-with-dependencies.jar"))],
  $ArbitraryNewData("write@jobs.build.steps.2")).

Write ("write@jobs.release.steps.1",
  ["releases", $Artifact(
    $StringLiteral("release@jobs.release.steps.1"),
    $StringLiteral("greeter-jar-with-dependencies.jar"))],
  $ArbitraryNewData("write@jobs.build.steps.2")).
...
```

753

755

750

FIGURE 7

```
...
WriteForEach("write@jobs.build.steps.2",
  $UnaryLocationReadOp($AnyFileUnderDirectory(),
    ["filesystem:jobs.build", $Filesystem(
      $StringLiteral("./target"))]),
  ["filesystem:jobs.build", $Filesystem($InductionVar())],
  $ArbitraryNewData("write@jobs.build.steps.2")).
...
```

800

```
...
Write("write@jobs.build.steps.2",
  ["filesystem:jobs.build", $Filesystem(
    $StringLiteral("./target/greeter-jar-with-dependencies.jar"))],
  $ArbitraryNewData("write@jobs.build.steps.2"))
...
```

850

FIGURE 8

```
name: CI
on: [push]
jobs:
  build:
    runs-on: ubuntu-latest

    steps:
    - uses: actions/checkout@8e5e7e5ab8b370d6c329ec48022133
    - uses: actions/setup-java@5ffc13f4174014e2d4d4572b3d74c3
      with:
        java-version: '17'
        distribution: 'temurin'
    - name: Build
      id: build
      run: |
        mvn package                                            925
    - name: Vars
      id: vars
      run: |
        ARTIFACT_FILEPATH=./target/greeter-jar-with-dependencies.jar
        echo "artifact_filepath=$ARTIFACT_FILEPATH" >> "$GITHUB_OUTPUT"
    - name: Upload build artifacts
      uses: actions/upload-artifact@0b7f8abb1508181956e8e162db84b4
      id: upload
      with:
        name: artifact
        path: ${{ steps.vars.outputs.artifact_filepath }}
        if-no-files-found: error
  release:
    needs: [build]
    runs-on: ubuntu-latest
    if: startsWith(github.ref, 'refs/tags/')
    steps:
      - name: Download artifact
        uses: actions/download-artifact@fb598a63ae348fa914e94cd0ff38f3
        id: download
        with:
          name: artifact
      - name: Create release
        uses: softprops/action-gh-release@de2c0eb89ae2a093876385947365ac
        id: release
        with:
          files: greeter-jar-with-dependencies.jar             950
```

900

*FIGURE 9*

STATIC DATAFLOW ANALYSIS FOR BUILD PIPELINES

BACKGROUND

A part of the software supply chain is the software build pipelines that compile the source code and produce the artifacts for later publication, distribution, deployment, etc. When assessing the security of software supply chain, or the provenance of a built software artifact, the build pipeline of software components may be analyzed to identify the output artifacts produced in response to inputs for running the build process. Analysis of the build pipeline may validate that the build process is performed in an expected and safe manner, and not in a manner that is vulnerable to malicious interference that could compromise the resulting artifacts generated from the build process.

Modern software build pipelines are often specified as workflows (e.g., in a workflow file) using a build pipeline specification language provided by a hosted build platform/service that is used to orchestrate and run the builds. Such specification languages include a declarative specification with operations that may define the various build steps, including invoking predefined build steps, or executing inline shell scripts. Data may flow between steps (and ultimately to an output) via many mechanisms such as pipeline variables, environment variables, files on local filesystem, files uploaded to artifact storage, etc.

A concern of the analysis is with resolving/tracking the flow of data (file data, variable values) as the data is produced, written, read, copied, uploaded/downloaded as artifacts/releases, and so on, such that the origin of data (including the final output artifacts or release files) may be traced back to an operation, e.g., a build command (e.g., Maven), that produced the data, with reasonable precision. Another example would be tracing the origin of input parameters provided to the build command back to where the build command is defined or originally provided. A challenge with analyzing the operations performed by the workflow is that the artifacts and data generated by the build process may not be explicitly referenced or identified by the operations specified in the workflow files used to build the artifacts.

SUMMARY

In general, in one or more aspects, the disclosure relates to a method that implements static dataflow analysis for build pipelines. The method includes receiving a workflow file that includes an operation. The method further includes applying an extraction model to the workflow file to generate an extracted statement for the operation. The method further includes applying a statement model to the extracted statement to identify an unresolved parameter of the extracted statement. The method further includes applying the statement model to the unresolved parameter to generate a resolved parameter using a set of extracted statements including the extracted statement. The method further includes presenting an output statement including the extracted statement with the resolved parameter.

In general, in one or more aspects, the disclosure relates to a system that includes at least one processor and an application that executes on the at least one processor. Executing the application performs receiving a workflow file that includes an operation. Executing the application further performs applying an extraction model to the workflow file to generate an extracted statement for the operation. Executing the application further performs applying a statement model to the extracted statement to identify an unresolved parameter of the extracted statement. Executing the application further performs applying the statement model to the unresolved parameter to generate a resolved parameter using a set of extracted statements including the extracted statement. Executing the application further performs presenting an output statement including the extracted statement with the resolved parameter.

In general, in one or more aspects, the disclosure relates to a non-transitory computer readable medium including instructions executable by at least one processor. Executing the instructions performs receiving a workflow file that includes an operation. Executing the instructions further performs applying an extraction model to the workflow file to generate an extracted statement for the operation. Executing the instructions further performs applying a statement model to the extracted statement to identify an unresolved parameter of the extracted statement. Executing the instructions further performs applying the statement model to the unresolved parameter to generate a resolved parameter using a set of extracted statements including the extracted statement. Executing the instructions further performs presenting an output statement including the extracted statement with the resolved parameter.

Other aspects of one or more embodiments may be apparent from the following description and the appended claims.

BRIEF DESCRIPTION OF DRAWINGS

FIG. 4, FIG. 5, FIG. 6, FIG. 7, FIG. 8, and FIG. 9 show examples in accordance with one or more embodiments of the disclosure.

Similar elements in the various figures are denoted by similar names and reference numerals. The features and elements described in one figure may extend to similarly named features and elements in different figures.

DETAILED DESCRIPTION

Embodiments of the disclosure perform static dataflow analysis for build pipelines. The analysis may resolve arguments that are not explicitly referenced or identified in operations in workflow files. An extraction model may process the workflow file to identify operations using language definitions and external action models to generate extracted statements. The extracted statements include information extracted from the workflow file. A statement model may process the extracted statements to identify unresolved parameters and expansion expressions. The unresolved parameters and expansion expressions may be resolved to form resolved statements and parameters that are used to update the extracted statements. The extracted statements, updated with the resolved statements, may be stored to an output file as output statements. The output statements include parameters from the extracted and resolved statements. The output file may be processed to identify portions of the workflow file that correspond with each other to build and store artifacts built in accordance with the workflow file.

The analysis parses the workflow file (also referred to as a workflow specification) and converts each step, shell-script-line, etc., from the workflow file into a statement that encapsulates reads/writes of values/data/strings to locations (including filesystem locations, environment variables, build pipeline variables, build pipeline artifact storage, etc.), with string values being represented and processed, since the string values form a basis by which locations of reads/writes are identified. The reads/writes may reference, e.g. variable names, filesystem paths, etc. The reads/writes may be dynamic values that are resolved statically before the effect of the write can be processed.

The string values allow file data to be resolved dynamically at execution since the content generated from a build pipeline may be unknowable statically before execution. Before execution, static analysis may be used to track the command and processes that produce file data. The static analysis performed may be concerned with determining aliasing relationships between references to storage locations in different parts of the pipeline (that is, whether references refer to the same storage location), and propagating values written to where the values are read, with a number of different kinds of such location references represented by strings (e.g. variable names, file paths, etc.). Processing and dereferencing specific strings may be performed more often than with a general static program analysis since build pipeline may be small and defined in their function, as compared to general purpose programs.

The analysis of the workflow files may be performed in two distinct stages, first the extractor phase, which parses the workflow file and produces the extracted statements, followed by the analysis phase, where analysis to resolve values/reads/writes is performed.

Figure 1:
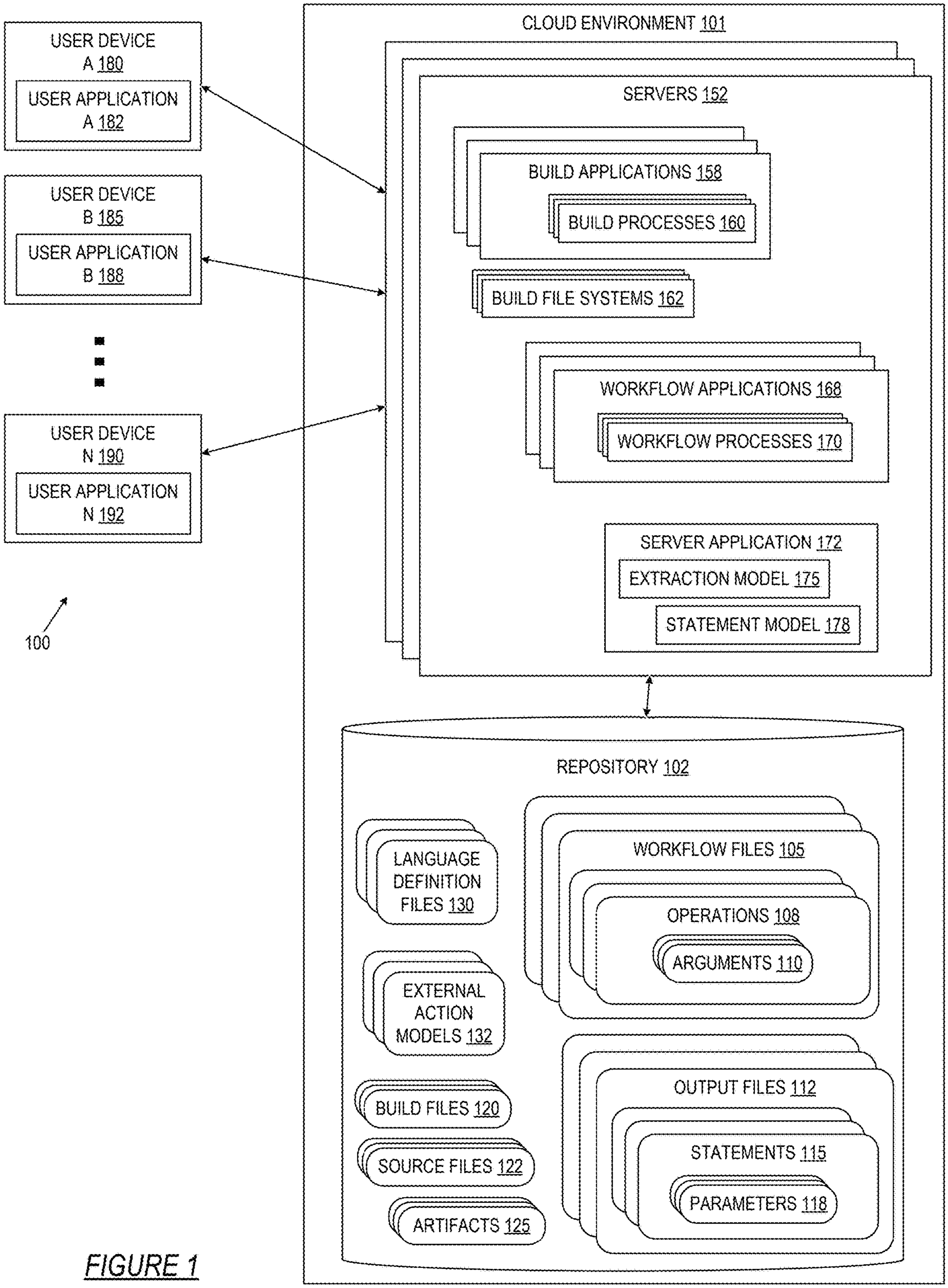
FIG. 1 and FIG. 2 show diagrams in accordance with one or more embodiments of the disclosure.

Turning to FIG. 1, the system (100) is a computing system shown in accordance with one or more embodiments. The system (100) and corresponding components may utilize the computing systems described in FIG. 10A and FIG. 10B to perform static dataflow analysis for build pipelines. The system (100) includes the cloud environment (101) with the servers (152) that communicate with the user devices A (180) and B (185) through N (190).

The cloud environment (101) is a cloud computing environment that provides scalable and flexible computing resources over a network, e.g., the internet. The cloud environment (101) may be public, private, or hybrid. The resources provided by the cloud environment (101), e.g., the servers (152), may be scaled to meet the demand of the users of the system (100). The cloud environment (101) includes the servers (152) and the repository (102).

The repository (102) is a type of storage unit and/or device (e.g., a file system, database, data structure, or any other storage mechanism) for storing the data used by the system (100). The repository (102) may include multiple different, potentially heterogenous, storage unites and/or devices. The repository (102) stores data utilized by other components of the system (100). The data stored by the repository (102) includes the workflow files (105), the output files (112), the build files (120), the source files (122), and the artifacts (125).

The workflow files (105) are collections of data that define the workflows that may be performed with the system (100). The workflows performed by the system (100) build software within the cloud environment (101). For example, the workflow files (105) may specify the build systems (155) that process the build files (120) and the source files (122) to generate the artifacts (125). The workflow files (105) include the operations (108).

The operations (108) are collections of text within the workflow files. In an embodiment, an operation is a string of text with a workflow file that defines values (e.g., environment variables) or provides instructions for executing commands to declare or execute part of one of the build processes (160). Performance of the operations (108) may define or execute the build processes (160) that generate the artifacts (125) from the build files (120) and the source files (122). The operations (108) include the arguments (110).

In an embodiment, the operations (108) may include definition operations and execution operations. A definition operation may define a name and may define a value for settings or variables used during execution of a workflow. And execution operation may identify a program to execute (with one or more of the arguments (110)) during execution of a workflow.

The arguments (110) are collections of data within the operations (108). In an embodiment, an argument may be a string of text that specifies an environment variable, a build system, a build file, a source file, an artifact, etc., used during one of the build processes (160). The output files (112) our collections of data that include information extracted from the workflow files (105). The output files include the statements (115).

The statements (115) are collections of text within the output files (112). In an embodiment, a statement may identify one of the artifacts (125) written to the repository (102) during execution of one of the build processes (160). The statements (115) include the parameters (118). The parameters (118) are collections of data within the statements (115). In an embodiment, a parameter may be a string of text within one of the statements (115) that specifies an identifier, a location, a value, etc., for one of the artifacts (125). The statements (115) may be referred to as different types of statements, including extracted statements, unresolved statements, resolved statements, output statements, etc. An extracted statement is one of the statements (115) with information extracted from one of the workflow files (105). An unresolved statement is a statement with parameters that are unresolved. A resolved statement is a statement in which an unresolved parameter has been resolved. An output statement is one of the statements (115) contained within one of the output files (112).

In an embodiment, one of the statements (115) may be a write statement that includes a set of parameters. The parameters of the write statement may include an identification parameter, a location parameter, and a value parameter. The identification parameter may uniquely identify a statement.

A number of different formats or styles may be used to organize information in the parameters. In an embodiment, the identification parameter may appear similar to an email address with an "@" symbol and multiple "." symbols separating pieces of information within the identification parameter. An example of an identification parameter is the string "write@jobs.build.steps.2" where "write" indicates that the statement is a write statement and "jobs.build-.steps.2" indicates that the statement is for a second step of a build process for a job of one of the workflow files (105). The location parameter may specify a location in a network for a resource. The location parameter may be in the form of a uniform resource identifier (URI), a path of a file system, etc. The value parameter may identify a value for the entity generated by the operation corresponding to the write statement. For example, the value parameter may identify an output of one of the operations (108) of one of the workflow files (105). The "@" and "." symbols are used as examples, other symbols may be used.

The build files (120) are collections of data that include instructions for building or compiling source code to executable code. The source code may be in the source files (122) and the executable code may be in the artifacts (125).

The source files (122) are collections of data that may contain source code for a software program or application. Source code may be a human-readable version of a program that is written in a programming language.

The artifacts (125) are collections of data that are produced during the development process of a software application. The artifacts (125) may include source code, executable code, configuration files, documentation, test cases, build files, etc.

The language definition files (130) are collections of data within the repository (102). The language definition files (130) define the syntax of the statements (115) and the parameters (118) that are used in the output files (112).

The external action models (132) are collections of data within the repository (102). The external action models (132) the operations (108) and arguments (110) from the workflow files (105) to the statements (115) and the parameters (118) of the output files (112).

Continuing with FIG. 1, the system (100) also may include the servers (152). The servers (152) are one or more computing systems in the cloud environment (101). The servers (152) may be added or removed from the system (100) on demand based on utilization of the system (100) by the users of the system (100). An example of the servers (152) may be the computing system (1400) shown in FIG. 10A. The servers (152) are the hardware used to operate the build applications (158), the build file systems (162), the workflow applications (168), and the server application (172).

The build applications (158) are software programs executing on one or more of the servers (152). The build applications (158) run the build processes (160). One of the build applications (158) may run several of the build processes (160).

The build processes (160) are software programs running as part of the build applications (158). In an embodiment, a build process executes instructions from one of the build files (120) to processes at least one of the source files (122) to generate at least one of the artifacts (125) (e.g., an executable file).

The build file systems (162) are software programs running on the servers (152) to store and retrieve files during execution of the build applications (158). The build file systems (162) may retrieve and store files with the repository (102) to be stored and managed locally on the servers (152), including one or more of the build files (120), the source files (122), and the artifacts (125).

The workflow applications (168) are software programs executing on one or more of the servers (152). The workflow applications (168) run the workflow processes (170). One workflow application may run several of the workflow processes (170).

The workflow processes (170) are software programs running as part of the workflow applications (168). In an embodiment, one of the workflow processes (170) executes instructions from one of the workflow files (105) to process one or more of the build files (120) to generate one or more of the artifacts (125) from the source files (122).

The server application (172) is a software program executing on one or more of the servers (152). The server application (172) may execute the extraction model (175) and the statement model (178) to process the workflow files (105) and generate the output files (112).

The extraction model (175) is a software program executing as part of the server application (172). The extraction model (175) processes the workflow files (105) to extract information from the operations (108) and arguments (110) that is used to form the statements (115) and the parameters (118).

The statement model (178) is a software program executing as part of the server application (172). The statement model (178) processes the statements (115) and the parameters (118) that are generated by the extraction model (175) to resolve information that was left unresolved by the extraction model (175) during the extraction process. The statement model (178) may generate the output files (112) that include the statements (115) and the parameters (118).

Continuing with FIG. 1, the user devices A (180) and B (185) through N (190) may interact with the server (152). The user devices A (180) and B (185) through N (190) may be computing systems in accordance with FIG. 10A and FIG. 10B. The user devices A (180) and B (185) through N (190) may include and execute the user applications A (182) and B (188) through N (192).

The user applications A (182) and B (188) through N (192) are programs that operate on the user devices A (180) and B (185) through N (190) to provide user interaction by collecting user inputs and displaying outputs in response to the user inputs. The user applications A (182) and B (188) through N (192) may include user interfaces with user interface elements to receive inputs and display outputs to users of the system (100).

In an embodiment, the user device A (180) is operated by a user to analyze the information in the workflow files (105). For example, the user may identify one of the workflow files (105) that the system processes to generate one of the output files (112). The output file generated may then be displayed on the user device A (180).

In an embodiment, the user device N (190) may be operated by a developer of the system (100). The developer may update the language definition files (130) and the external action models (132) to adjust the contents of the output files (112) created from the workflow files (105).

Although described within the context of a client server environment with servers and user devices, aspects of the disclosure may be practiced with a single computing system and application. For example, a monolithic application may operate on a computing system to perform the same functions as one or more of the applications executed by the servers (152) and the user devices A (180) and B (185) through N (190).

Figure 2:
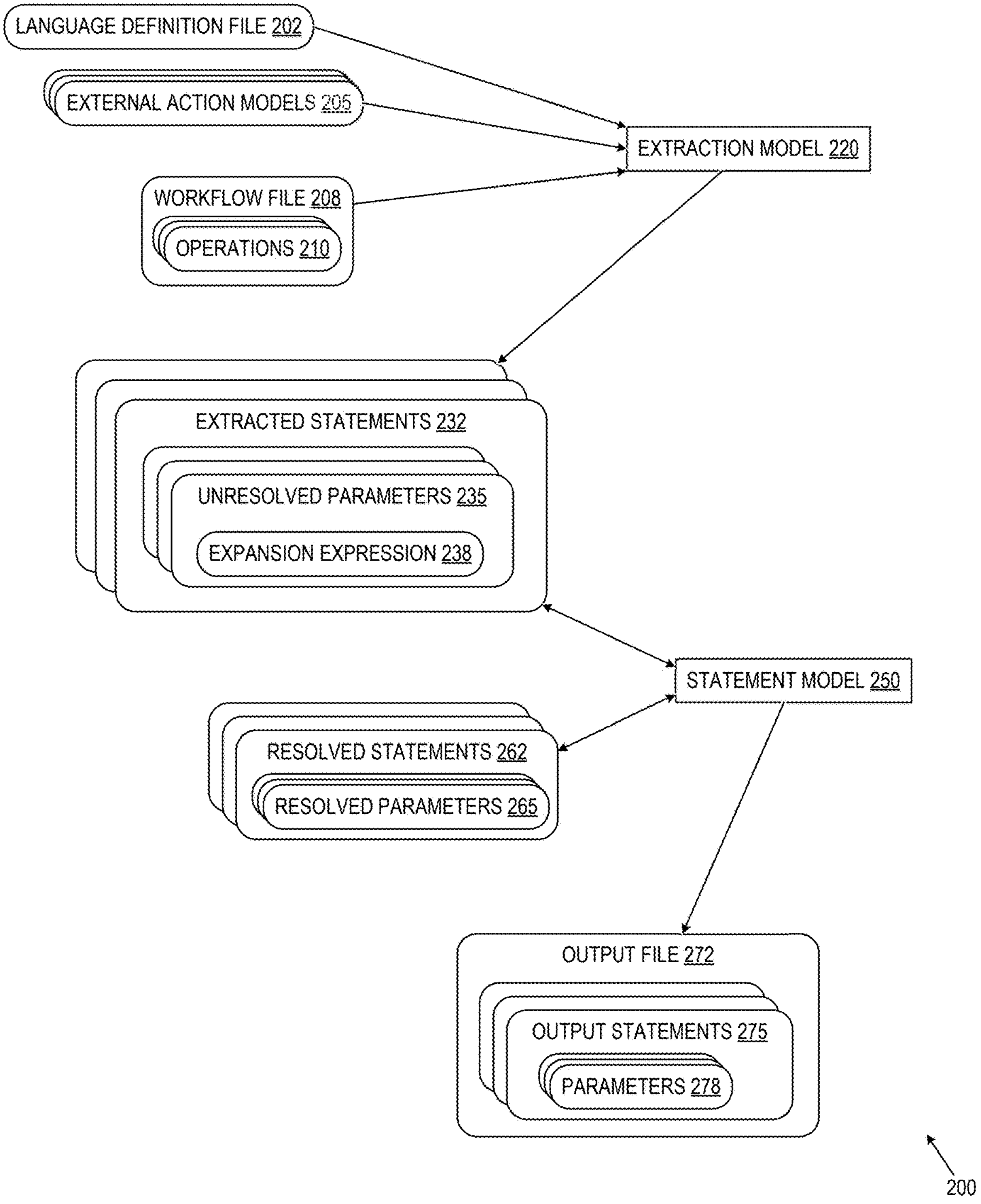

Turning to FIG. 2, the data flow (200) shows the flow of data through a system to analyze the workflow file (208). The data flow (200) may be the flow of data through the server application (172) of FIG. 1.

The extraction model (220) receives the language definition file (202), the action models (205), and the workflow file (208). The extraction model (220) processes the workflow file (208) with the external action models (205) to generate the extracted statements (232). In an embodiment, the extraction model extracts information using a mapping from the external action models (205) that identify the operations (210), which are mapped to the extracted statements (232).

The extracted statements (232) include the unresolved parameters (235). In an embodiment, one of the extracted statements (232) may include one or more of the unresolved parameters (235).

The unresolved parameters (235) may include the expansion expression (238). In an embodiment, the expansion expression (238) may be one of the unresolved parameters (235) that is a placeholder for multiple pieces of information. For example, the output of a build command may produce several files with names that are unresolved but are represented by the expansion expression (238).

The statement model (250) processes the extracted statements (232) to resolve the unresolved parameters (235), generate the resolved statements (262), and produce the output file (272). The statement model (250) may process one of the extracted statements (232) to identify one of the unresolved parameters (235). The statement model (250) further processes a set of extracted statements (232) to identify information from the extracted statements (232) that may be used to resolve one of the unresolved parameters (235) and form one of the resolved parameters (265). The resolved parameters (265) identified with the statement model (250) may then be used to update the extracted statements (232) to replace one or more of the remaining unresolved parameters (235) with one or more of the resolved parameters (265) and form the resolved statements (262). The statement model (250) generates the output file (272) from the extracted statements (232) and the resolved statements (262). One or more of the extracted statements (232) may not include an unresolved parameter prior to processing by the statement model (250) and may flow to the output file (272) without replacement of the parameters.

One or more of the extracted statements (232) may include one or more of the unresolved parameters (235) after processing by the statement model (250). Some of the unresolved parameters (235) may not be resolvable by the statement model (250). Thus, the output statements (275) of the output file (272) may include one or more of the extracted statements (232) that have no unresolved parameters, may include one or more of the resolved statements (262) that include the resolved parameters (265), and may include one or more of the extracted statements (232) that still have one or more of the unresolved parameters (235).

Figure 3:
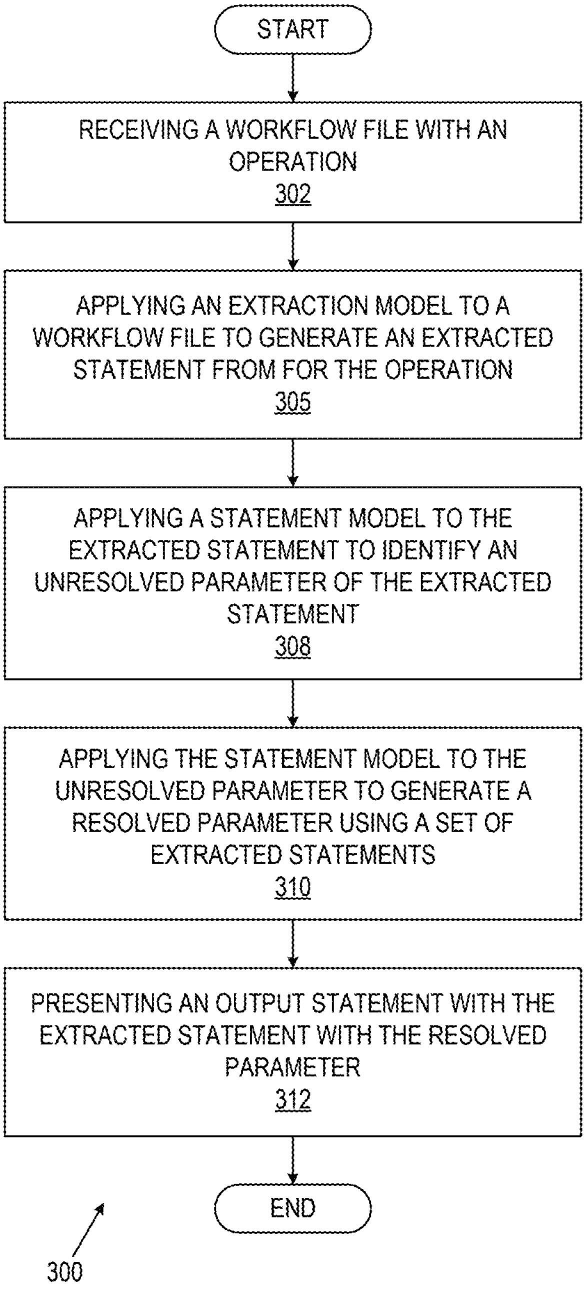
FIG. 3 shows a method in accordance with one or more embodiments of the disclosure.

FIG. 3 shows the process (300) for static dataflow analysis for build pipelines. In an embodiment, a system may include at least one processor and an application that, when executing on the at least one processor, performs the processes (300). In one embodiment, a non-transitory computer readable medium may include instructions that, when executed by one or more processors, perform the process (300).

Turning to FIG. 3, the process (300) analyzes statements from workflow files. The process (300) may include multiple steps (e.g., steps 302 through 312) that may execute on the components described in the other figures, including those of FIG. 1.

Step 302 includes receiving a workflow file comprising an operation. In an embodiment, the workflow file may be identified with a user interface that receives input from a user. For example, the user may use a command line prompt, a text box of a graphical user interface, etc., to specify a workflow file. In an embodiment, the workflow file may be identified in a shell script executed as part of an automated process.

The operation may be one of a set of operations defined within the workflow file. The operation may be a definition operation or an execution operation. In an embodiment, the extracted statement may be a write statement with a set of three parameters including an identification parameter, a location parameter, and a value parameter.

Step 305 includes applying an extraction model to a workflow file to generate an extracted statement for the operation. In an embodiment, the application of the extraction model includes identifying the operation from the workflow file, matching the operation to an external action model, applying an external action model to the operation, and outputting the extracted statement using the mapping. The external action model maps between an operation and an extracted statement. In an embodiment, an external action model may map an operation to a set of parameters of an extracted statement. An external action model may define a set of parameters for the extracted statement based on an operation. One operation may map to multiple extracted statements. Information from the arguments of the operations is used to form the extracted statements. Information from an argument of an operation may be mapped to the information of a parameter of an extracted statement. For example, the argument may specify a location in a network of a resource, which is included in a parameter of an extracted statement.

One or more of the parameters of the extracted statements generated by the extraction model may be unresolved. One or more of the mappings used by the extraction model may specify unresolved parameters for an extracted statement generated from an operation.

For example, an extracted statement that corresponds to an operation for building a software program may not identify the artifacts generated during the build process (e.g., the intermediate or executable files created from the source files). In this case, the unresolved parameter of the extracted statement may indicate that files are created by the names of the files.

In an embodiment, applying the extraction model may include applying an external action model.

Step 308 includes applying a statement model to the extracted statement to identify an unresolved parameter of the extracted statement. In an embodiment, application of the statement model includes scanning the extracted statements generated from the extraction model to identify one or more parameters from the extracted statements that are unresolved parameters.

Step 310 includes applying the statement model to the unresolved parameter to generate a resolved parameter using a set of extracted statements that include the extracted statement. In an embodiment, the unresolved parameter may be resolved with information from another extracted statement. For example, the unresolved parameter may not identify a file or location that is identified in the other extracted statement. The information from the other statement may be used to replace the unresolved parameter with a resolved parameter (e.g., an identification of a file or location) to update the extracted statement to form a resolved statement. In an embodiment, the unresolved parameter may be resolved by converting the extracted statement into multiple statements. For example, the unresolved parameter of the extracted statement may identify a collection of files without specifying the names and locations of the individual files within the collection. Such an extracted statement may be converted into multiple statements referred to as resolved statements. In this case, each of the resolved statements identifies an individual file from the collection of files from the unresolved parameter of the original extracted statement.

In an embodiment, an unresolved parameter is resolved with a previous resolved parameter to form the resolved parameter. The resolution of parameters may be formed with multiple iterations or passes. For example, a first iteration may resolve a first set of unresolved parameters but leave a second set of unresolved parameters unresolved. A second iteration may resolve a portion of the second set of unresolved parameters, resolving some of the parameters and leaving others still unresolved. The iterations may continue until the each of the unresolved parameters is resolved or until no more of the remaining unresolved parameters are resolved. For example, if each of the unresolved parameters are resolved, then no more iterations are performed. Additionally, if during an iteration there is not at least one of the unresolved parameters of the set of unresolved parameters that is resolved, then no more iterations may be performed.

In an embodiment, the unresolved parameter includes an expansion expression from which multiple resolved statements are generated. As an example, the unresolved parameter may be within an extracted statement identified as a "write for each" statement and the unresolved parameter may be a placeholder for a collection of files. The names of the files in the collection may not be resolved in the "write for each" statement. The resolution process may replace the "write for each" statement with a write statement for each of the files identified as part of the collection.

Step 312 includes presenting an output statement comprising the extracted statement with the resolved parameter. In an embodiment, the output statement may be presented with a set of output statements that correspond to the set extracted statements. The set of output statements may include an output statement in which a parameter remains unresolved. Presentation of the output statement may be performed by transmitting the output statement to a user device that displays the output statement to a user. In an embodiment, the output statement with the resolved parameter may be displayed with a second extracted statement comprising a second unresolved parameter that has not been resolved.

In an embodiment, the workflow file is presented with an identification of the operation. The identification of the operation may be performed by highlighting the operation, drawing a line around the operation, etc., to indicate that the operation being identified is the operation that generates the artifacts produced by executing the workflow file. Other operations may be identified for other reasons.

Turning to FIG. 4, the text (400) shows examples of definitions that may be in a language definition file. Different definitions than those shown may be used. The definitions may define the syntax used for statements with information extracted from workflow files. The definitions define the names of statements and the parameters within the statements. The parameters are defined with name value pairs to identify the name of the parameter along with the type of the parameter. The ellipsis (" . . . ") at lines "01" and "25" indicate that the text may appear within a larger file with additional lines.

Lines "02" through "04" define a "Write" statement using the ".decl" keyword. The "Write" statement includes three parameters "writeStmt: WriteStmt", "location: Location", and "value: Value".

The text "writeStmt: WriteStmt" at line "02" indicates that the first parameter of the "Write" statement is named "writeStmt" and has a value of the type "WriteStmt". In an embodiment, the "WriteStmt" type may be formed with an "@" symbol and multiple "." symbols separating information. The "@" symbol may separate the name of the statement from the context of the statement from within the workflow file. The "." symbols may separate contextual elements from the workflow file. An example of a string with a "WriteStmt" type is "write@jobs.build.steps.2" in which the "@" symbol separates the name "write" from the context "jobs.build.steps.2" and the "." symbol separates the contextual elements of "jobs", "build", "steps", and "2". The "@" and "." symbols are used as examples, other symbols may be used.

The text "location: Location" at line "03" indicates that the second parameter of the "Write" statement is named "location" and has a value of the type "Location". The "Location" type is defined at lines "06" to "07".

The text "value: Value" at line "04" indicates that the third parameter of the "Write" statement is named "value" and has a value of the type "Value". The "Value" type is defined at lines "12" to "20".

Lines "06" through "07" define a "Location" type using the ".type" keyword. The "Location" type includes two parameters "scope: ScopeId" and "loc: LocationSpecifier".

The text "scope: ScopeId" at line "06" indicates that the first parameter of the "Location" type is named "scope" and has a value of the type "ScopeId". As an example, a text value of the type "ScopeId" may be "filesystem: jobs.build".

The text "loc: LocationSpecifier" at line "07" indicates that the second parameter of the "Location" type is named "loc" and has a value of the type "LocationSpecifier". The "LocationSpecifier" type is defined at lines "08" to "11".

Lines "08" through "11" define a "LocationSpecifier" type using the ".type" keyword. The "LocationSpecifier" type includes one parameter that may be one of multiple types, which may have multiple sub-parameters. For example, the "LocationSpecifier" type may be one of a "Filesystem", a "Variable", an "Artifact", or something else (as indicated by the ellipsis " . . . " at line "11").

When a "LocationSpecifier" is a "Filesystem", then one parameter is included named "path" that is of the type "Value". In an embodiment, the "Filesystem" type identifies the file system that may be used by a workflow process to store and retrieve data.

When a "LocationSpecifier" is a "Variable", then one parameter is included named "name" that is of the type "Value". In an embodiment, the "Variable" type identifies an environment variable used by a workflow process to process files during a build process.

When a "LocationSpecifier" is an "Artifact", then two parameters are included, the first parameter named "name" of the type "Value" and the second parameter named "file" of the type "Value". In an embodiment, the "Artifact" type identifies an artifact used or created by a workflow process during a build.

Lines "12" through "20" define a "Value" type using the ".type" keyword. The "Value" may be one of multiple types, which may have multiple sub-parameters. For example, the "Value" type may be one of a "StringLiteral", a "Read", an "ArbitraryNewData", a "UnaryStringOp", a "BinaryStringOp", or something else (as indicated by the ellipsis " . . . " at line "20").

When a "Value" is a "StringLiteral", then one parameter is included named "str" that is of the type "symbol". In an embodiment, the "StringLiteral" type identifies a string of text.

When a "Value" is a "Read", then one parameter is included named "Loc" that is of the type "Location". In an embodiment, the "Read" type indicates that a value should be "read" from another location.

When a "Value" is "ArbitraryNewData", then one parameter is included named "at" that is of the type "WriteStmt". In an embodiment, the "ArbitraryNewData" type indicates that new data may be arbitrarily written as part of an operation from a workflow file.

When a "Value" is "UnaryStringOp", then two parameters are included, the first named "operator" that is of the type "UnaryStringOperator" and the second named "operand" that is of the type "Value". In an embodiment, the "UnaryStringOp" allows a string operation that operates one string to be performed. For example, the "toLower" operation may be a unary string operation operating on a single string to replace each, if any, uppercase character with a corresponding lowercase character.

When a "Value" is "BinaryStringOp", then three parameters are included, the first named "operator" that is of the type "BinaryStringOperator", the second named "operand1" that is of the type "Value", and "operand2" that is of the type "Value". In an embodiment, the "BinaryStringOp" allows a string operation that operates two strings to be performed. For example, the "concat" operation may be a binary string operation operating on two strings to concatenate the second string to an end of the first string.

Lines "21" through "24" define a "WriteForEach" statement using the ".decl" keyword. The "WriteForEach" statement includes an additional parameter to the three parameters for the "Write" statement from lines "02" through "04". The additional parameter has the name "collection" and has a value of the type "Value".

Turning to FIG. 5, the text (500) is an example of text from a workflow file. Line "03" begins a list of "jobs" that may be performed by one or more workflow processes, which may trigger one or more build processes. The "jobs" include the "build" job from lines "04" through "28" and the "release" job from lines "29" through "43". The "build" job and the "release" job each include multiple steps identified with a "-" symbol. Each step may include multiple definitions or commands.

Turning to FIG. 6, the text (600) is an example of extracted statements. The extracted statements of the text (600) may be generated during an initial iteration from the text (500) of FIG. 5. The extracted statements of the text (600) may include unresolved parameters. In an embodiment, the steps identified in the extracted statements may identify the first step of a job as step "0".

The extracted statement (603) (at lines "02" through "05") was generated from lines "13" through "16" of the text (500) of FIG. 5 after multiple iterations. The multiple iterations are described with FIG. 8.

The extracted statement (605) (at lines "06" through "09") is a write statement that was generated from lines "17" through "20" of the text (500) of FIG. 5. The extracted statement (605) captures the command "ARTIFACT_FILEPATH=./target/greeter-jar-with-dependencies.jar" from line "20" of the text (500) of FIG. 5.

The extracted statement (607) (at lines "10" through "15") is a write statement that was generated from lines "17" through "19" and "21" of the text (500) of FIG. 5. The extracted statement (607) captures the command "echo "artifact_filepath=$ARTIFACT_FILEPATH">> "$GITHUB_OUTPUT"" from line "21" of the text (500) of FIG. 5 and includes multiple unresolved parameters.

The extracted statement (609) (at lines "16" through "23") is a write statement that was generated from lines "22" through "28" of the text (500) of FIG. 5. The extracted statement (609) of lines "16" through "23" includes multiple unresolved parameters.

The text (650) is an updated version of the text (600) that resolves several of the unresolved parameters from the text (600) to form resolved parameters and statements in the text (650). The extracted statements (653) and (655) are copies of the extracted statements (603) and (605), which did not include unresolved parameters.

The resolved statement (657) is generated from the extracted statement (607) after resolving the parameters within the extracted statements (607). The unresolved parameter at extracted statement (607) lines "11" through "13" is resolved to the resolved parameter at extracted statement (657) lines "11" through "12". The unresolved parameter at extracted statement (607) lines "14" through "15" is resolved to the resolved parameter at extracted statement (657) line "13".

The resolved statement (659) is generated from the extracted statement (609) after resolving the parameters within the extracted statements (609). The unresolved parameter at extracted statement (609) lines "17" through "20" is resolved to the resolved parameter at extracted statement (657) lines "15" through "16". The unresolved parameter at extracted statement (607) lines "21" through "23" is resolved to the resolved parameter at extracted statement (657) line "17".

Turning to FIG. 7, the text (700) is an example of extracted statements. The extracted statements of the text (700) may be generated during an initial iteration from the text (500) of FIG. 5. The extracted statements of the text (700) may include unresolved parameters.

The extracted statement (703) (at lines "02" through "07") is generated from lines "34" through "38" of the text (500) of FIG. 5. The extracted statement (705) (at lines "08" through "14") is generated from lines "39" through "43" of the text (500) of FIG. 5. The extracted statements (703) and (705) each include unresolved parameters.

The text (750) is an updated version of the text (700). The text (750) resolves several of the unresolved parameters from the text (700) to form resolved parameters and statements in the text (750).

The resolved statement (753) is generated from the extracted statement (703) after converting the "WriteForEach" statement of the extracted statement (703) to the "Write" statement of the resolved statement (753) and resolving the parameters within the extracted statements (707). To resolve the "WriteForEach" statement, a "Write" statement is generated for each of the items identified by the second parameter of the "WriteForEach" statement. The second parameter of the "WriteForEach" statement of the extracted statement (703) at lines "03" to "04" resolves to a single item so that one "Write" statement (i.e., the resolved statement (753)) is generated.

The statement (755) may be referred to as an extracted statement, a resolved statement, or a write statement since the statement (755) includes extracted information, includes a parameter that was unresolved and has been resolved, and is in the form of a "Write" statement. The unresolved parameter at extracted statement (705) lines "09" through "12" is resolved to the resolved parameter at extracted statement (755) lines "07" through "09". The unresolved parameter at extracted statement (705) lines "13" through "14" is resolved to the resolved parameter at extracted statement (755) line "10".

Turning to FIG. 8, the text (800) is an example of a statement with information extracted from the text (500) of FIG. 5 of a workflow file. The statement of the text (800) that may be generated during an initial iteration from the text (500) of FIG. 5 may include unresolved parameters. The statement in the text (800) is generated from lines "13" through "16" of the text (500) of FIG. 5 and includes unresolved parameters.

The text (850) is an updated version of the text (800). The text (850) resolves several of the unresolved parameters from the text (800) to form resolved parameters and statements in the text (850).

The resolved statement in the text (850) is generated from the extracted statement in the text (800) after converting the "WriteForEach" statement in the text (800) to the "Write" statement in the text (850) and resolving the unresolved parameters. To resolve the "WriteForEach" statement, a "Write" statement is generated for each of the items identified by the second parameter of the "WriteForEach" statement. The second parameter of the "WriteForEach" statement at lines "03" to "05" of the text (800) resolves to a single item so that one "Write" statement is generated in the text (850).

Turning to FIG. 9, the user interface (900) may be displayed on a user device. The user interface (900) displays the text (500) from FIG. 5 for a workflow file. The user interface (900) may be part of an integrated development environment (IDE) used to edit, review, and maintain programming code.

The user interface (900) includes the highlights (925) and (950). The user may select one or more of lines "39" through "43", e.g., by hovering the mouse cursor over one of lines "39" through "43", to trigger the highlight (950). The workflow file may indicate that the command line "16" generated the files identified at line "43". Responsive to determining that the command at line "16" generated the files referenced by line "43", the system may display the highlight (925) to provide an indication to the user that the command "mvn package" generated the file "greeter-jar-with-dependencies.jar".

Figure 10A:
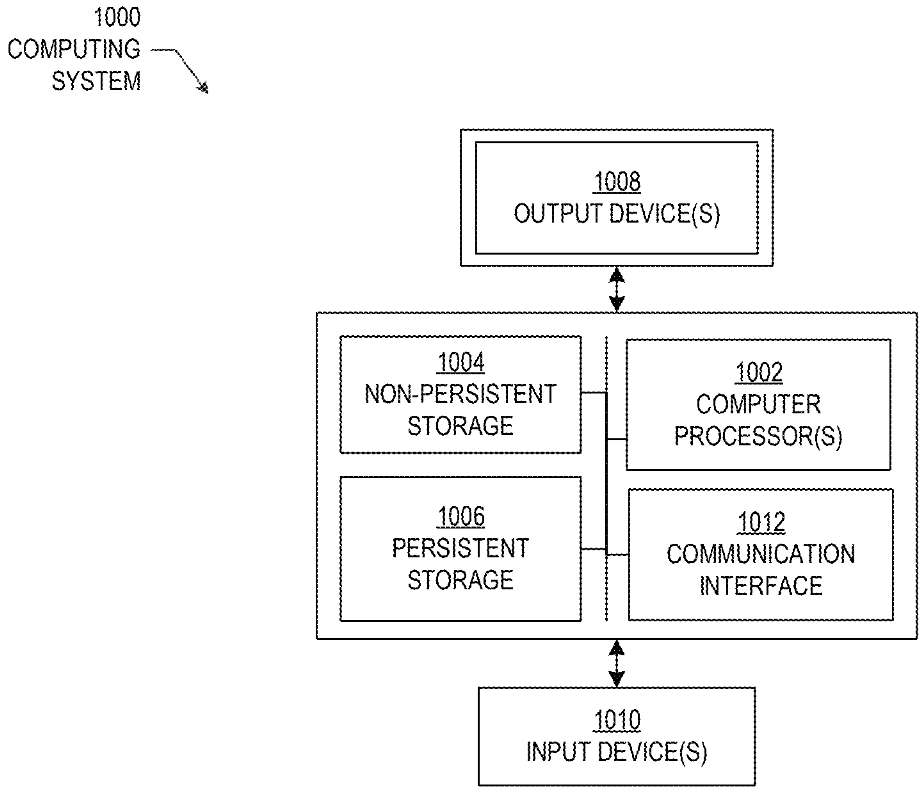
FIG. 10A and FIG. 10B show computing systems in accordance with one or more embodiments.
Figure 10B:
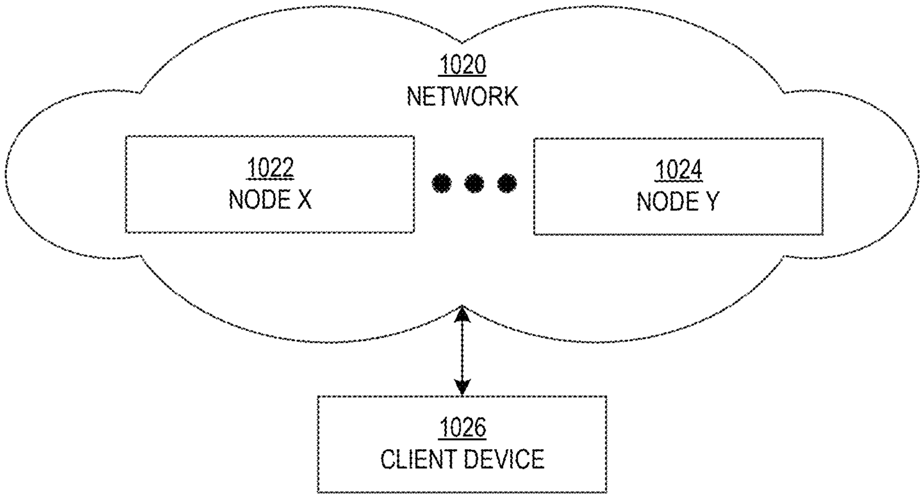

Embodiments may be implemented on a special purpose computing system specifically designed to achieve the improved technological result. Turning to FIG. 10A and FIG. 10B, the special purpose computing system (1000) may include one or more computer processors (1002), non-persistent storage (1004), persistent storage (1006), a communication interface (1012) (e.g., Bluetooth interface, infrared interface, network interface, optical interface, etc.), and numerous other elements and functionalities that implement the features and elements of the disclosure. The computer processor(s) (1002) may be an integrated circuit for processing instructions. The computer processor(s) may be one or more cores or micro-cores of a processor. The computer processor(s) (1002) includes one or more processors. The one or more processors may include a central processing unit (CPU), a graphics processing unit (GPU), a tensor processing unit (TPU), combinations thereof, etc.

The input devices (1010) may include a touchscreen, keyboard, mouse, microphone, touchpad, electronic pen, or any other type of input device. The input devices (1010) may receive inputs from a user that are responsive to data and messages presented by the output devices (1008). The inputs may include text input, audio input, video input, etc., which may be processed and transmitted by the computing system (1000) in accordance with the disclosure. The communication interface (1012) may include an integrated circuit for connecting the computing system (1000) to a network (not shown) (e.g., a local area network (LAN), a wide area network (WAN) such as the Internet, mobile network, or any other type of network), and/or to another device, such as another computing device.

Further, the output devices (1008) may include a display device, a printer, external storage, or any other output device. One or more of the output devices may be the same or different from the input device(s). The input and output device(s) may be locally or remotely connected to the computer processor(s) (1002). Many different types of computing systems exist, and the aforementioned input and output device(s) may take other forms. The output devices (1008) may display data and messages that are transmitted and received by the computing system (1000). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

The nodes (e.g., node X (1022), node Y (1024)) in the network (1020) may be configured to provide services for a client device (1026), including receiving requests and transmitting responses to the client device (1026). For example, the nodes may be part of a cloud computing system. The client device (1026) may be a computing system, such as the computing system shown in FIG. 10A. Further, the client device (1026) may include and/or perform all or a portion of one or more embodiments of the disclosure.

The computing system of FIG. 10A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an "or" may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description.

Further, other embodiments not explicitly described above may be devised which do not depart from the scope of the claims as disclosed herein. Accordingly, the scope should be limited only by the attached claims.

What is claimed is:

1. A computer implemented method for performing static dataflow analysis of a workflow file comprising:

receiving the workflow file comprising an operation, wherein the workflow file defines a workflow to build software;

extracting an extracted statement for the operation from the workflow file using an extraction model, wherein the operation comprises one of a definition operation and an execution operations, the definition operation defining a value for one or more settings and variables used during execution of the workflow file;

identifying an unresolved parameter of the extracted statement from the extracted statement using a statement model;

dynamically generating a resolved parameter from the unresolved parameter using the statement model and a set of extracted statements comprising the extracted statement; and presenting an output statement comprising the extracted statement with the resolved parameter.

2. The method of claim 1, wherein the workflow file comprises a set of operations comprising the operation.

3. The method of claim 1, wherein the operation comprises one of a definition operation and an execution operation.

4. The method of claim 1, further comprising:

applying the extraction model to the workflow file, wherein the extracted statement comprises a write statement comprising a set of three parameters comprising an identification parameter, a location parameter, and a value parameter.

5. The method of claim 1, wherein applying the extraction model to the workflow file further comprises:

applying an external action model to the operation to map the operation to a set of parameters of the extracted statement, wherein the external action model defines the set of parameters for the extracted statement based on the operation.

6. The method of claim 1, further comprising:

applying the statement model to the unresolved parameter, wherein the unresolved parameter is resolved with a previous resolved parameter to form the resolved parameter.

7. The method of claim 1, further comprising:

applying the statement model to the unresolved parameter, wherein the unresolved parameter comprises an expansion expression from which a plurality of resolved statements are generated.

8. The method of claim 1, further comprising:

presenting the output statement with a set of output statements comprising the output statement, wherein the set of output statements comprises a second extracted statement comprising a second unresolved parameter.

9. The method of claim 1, further comprising:

presenting the output statement with a set of output statements comprising the output statement, wherein the output statement with the resolved parameter is displayed with a second extracted statement comprising a second unresolved parameter.

10. The method of claim 1, further comprising:

presenting the workflow file with an identification of the operation.

11. A system for performing static dataflow analysis of a workflow file comprising:

at least one processor;

an application that, when executing on the at least one processor, performs:

receiving the workflow file comprising an operation, wherein the workflow file defines a workflow to build software;

extracting an extracted statement for the operation from the workflow file using an extraction model, wherein the operation comprises one of a definition operation and an execution operations, the definition operation defining a value for one or more settings and variables used during execution of the workflow file;

identifying an unresolved parameter of the extracted statement from the extracted statement using a statement model;

dynamically generating a resolved parameter from the unresolved parameter using the statement model and a set of extracted statements comprising the extracted statement; and presenting an output statement comprising the extracted statement with the resolved parameter.

12. The system of claim 11, wherein the workflow file comprises a set of operations comprising the operation.

13. The system of claim 11, wherein the operation comprises one of a definition operation and an execution operation.

14. The system of claim 11, wherein the application further performs:

applying the extraction model to the workflow file, wherein the extracted statement comprises a write statement comprising a set of three parameters comprising an identification parameter, a location parameter, and a value parameter.

15. The system of claim 11, wherein applying the extraction model to the workflow file further comprises:

applying an external action model to the operation to map the operation to a set of parameters of the extracted statement, wherein the external action model defines the set of parameters for the extracted statement based on the operation.

16. The system of claim 11, wherein the application further performs:

applying the statement model to the unresolved parameter, wherein the unresolved parameter is resolved with a previous resolved parameter to form the resolved parameter.

17. The system of claim 11, wherein the application further performs:

applying the statement model to the unresolved parameter, wherein the unresolved parameter comprises an expansion expression from which a plurality of resolved statements are generated.

18. The system of claim 11, wherein the application further performs:

presenting the output statement with a set of output statements comprising the output statement, wherein the set of output statements comprises a second extracted statement comprising a second unresolved parameter.

19. The system of claim 11, wherein the application further performs:

presenting the output statement with a set of output statements comprising the output statement, wherein the output statement with the resolved parameter is displayed with a second extracted statement comprising a second unresolved parameter.

20. A non-transitory computer readable medium for performing static dataflow analysis of a workflow file comprising instructions executable by at least one processor to perform:

receiving the workflow file comprising an operation, wherein the workflow file defines a workflow to build software;

extracting an extracted statement for the operation from the workflow file using an extraction model, wherein the operation comprises one of a definition operation and an execution operations, the definition operation defining a value for one or more settings and variables used during execution of the workflow file;

identifying an unresolved parameter of the extracted statement from the extracted statement using a statement model;

dynamically generating a resolved parameter from the unresolved parameter using the statement model and a set of extracted statements comprising the extracted statement; and presenting an output statement comprising the extracted statement with the resolved parameter.

* * * * *